US008332192B2

(12) United States Patent
Lu

(10) Patent No.: US 8,332,192 B2
(45) Date of Patent: Dec. 11, 2012

(54) ASYNCHRONOUS STOCHASTIC LEARNING CURVE EFFECTS IN A LARGE SCALE PRODUCTION SYSTEM

(75) Inventor: Roberto F. Lu, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 551 days.

(21) Appl. No.: 11/763,402

(22) Filed: Jun. 14, 2007

(65) Prior Publication Data
US 2008/0294395 A1 Nov. 27, 2008

Related U.S. Application Data

(60) Provisional application No. 60/939,311, filed on May 21, 2007.

(51) Int. Cl.
*G06G 7/48* (2006.01)
*G06F 15/18* (2006.01)
(52) U.S. Cl. .................... 703/6; 703/8; 706/16
(58) Field of Classification Search .............. 703/6, 8; 706/16, 25
See application file for complete search history.

(56) References Cited

U.S. PATENT DOCUMENTS

| | | | |
|---|---|---|---|
| 6,636,242 B2* | 10/2003 | Bowman-Amuah | 715/764 |
| 7,117,130 B1 | 10/2006 | Megiddo | |
| 2006/0129970 A1* | 6/2006 | Haas et al. | 717/104 |

OTHER PUBLICATIONS

Van Der Merwe "The Learning Curve for Industry", 1999.*
AEW Services (Applying Resources Loading, Production & Learning Curves to Construction: A Pragmatic Approach; 1994, "From the Canadian Journal of Civil Engineering", vol. 21).*
Marvin B. Leiberman (Learning Curve, Diffusion, and Competitive Strategy-SMJ/1987).*
Argote, et al., "Learning Curves in Manufacturing", Science 23, vol. 247, No. 4945, Feb. 1990, pp. 920-924.
Biskup, et al., "Common Due Date Scheduling with Autonomous and Induced Learning", European Journal of Operational Research, vol. 159, Issue 3, Dec. 16, 2004, pp. 606-616.
Demeester, et al., "Managing Learning Resources for Consecutive Product Generations", International Journal of Production Economics, vol. 95, Issue 2, Feb. 2005, pp. 265-283.
Everett, et al., "Data Representation for Predicting Performance with Learning Curves", Journal of Construction Engineering and Management, vol. 123, No. 1, Mar. 1997, pp. 46-52.
Everett, et al., "Learning Curve Predictors for Construction Field Operations", Journal of Construction Engineering and Management, vol. 120, No. 3, Sep. 1994, pp. 603-616.
Gu, et al., "How Bad May Learning Curves Be?", IEEE Transactions on Pattern Analysis and Machine Intelligence, vol. 22, No. 10, Oct. 2000, pp. 1155-1167.

(Continued)

*Primary Examiner* — Dwin M Craig
*Assistant Examiner* — Andre Pierre Louis
(74) *Attorney, Agent, or Firm* — Caven & Aghevli LLC

(57) ABSTRACT

Systems and methods for arithmetic modeling of large scale engineer-to-order production systems using asynchronous stochastic learning curve are disclosed. In one embodiment, a method for simulating a production system configured to produce a product includes, for a plurality of components, assigning learning curve parameters for an asynchronous stochastic learning curve associated with each component. Master schedule data for manufacturing a plurality of the product are received, and production of the plurality of components a plurality of cycles corresponding to the plurality of the product is simulated. The results of the simulated productions are output for analysis. In a further aspect, the product is an aircraft, and the components are aircraft components.

16 Claims, 5 Drawing Sheets

OTHER PUBLICATIONS

Jaber et al, "Learning Curves for Processes Generating Defects Requiring Reworks," European Journal of Operation Research, Elsevier B.V., 2004, pp. 663-672.

Jeong, et al., "Feature Selection Techniques and Comparative Studies for Large-scale Manufacturing Processes", The International Journal of Advanced Manufacturing Technology, vol. 28, No. 9, Apr. 2006, pp. 1006-1011.

Lev, et al., "Book Review", Interfaces, vol. 34, Issue 5, Oct. 2004, pp. 405-406.

Levin, et al., "A Statistical Approach to Learning and Generalization in Layeredneural Networks", Proceedings of the IEEE, vol. 78, Issue 10, Oct. 1990, pp. 1568-1574.

Levin, et al., "Generating Learning Curves for Individual Products from Aggregated Data", International Journal fo Production Research, vol. 31, Issue 12, Dec. 1993, pp. 2807-2815.

Liang, et al., "Product Modeling for Multidisciplinary Collaborative Design", The International Journal of Advanced Manufacturing Technology, vol. 30, No. 7-8, Oct. 2006, pp. 589-600.

Morton, et al., "Managing Relationships to Improve Performance: A Case Study in the Global Aerospace Industry", International Journal of Production Research, vol. 44, No. 16, Aug. 15, 2006, pp. 3227-3241.

Mosheiov, et al., "Scheduling with General Job-Dependent Learning Curves", European Journal of Operational Research, vol. 147, Issue 3, Jun. 16, 2003, pp. 665-670.

Norfleet, "Loss of Learning in Disruption Claims", Cost Engineering, vol. 47, No. 11, Nov. 2005, pp. 10-14.

Schafer, et al., "The Effects of Worker Learning, Forgetting, and Heterogeneity on Assembly Line Productivity", Management Science, vol. 47, No. 12, Dec. 2001, pp. 1639-1653.

Vits, et al., "Production Process Changes: A Dynamic Programming Approach to Manage Effective Capacity and Experience", International Journal of Production Economics, vol. 104, Issue 2, Dec. 2006, pp. 473-481.

Wu, et al., "A Project Scheduling and Staff Assignments Model Considering Learning Effect", The International Journal of Advanced Manufacturing Technology, vol. 28, No. 11-12, May 2006, pp. 1190-1195.

Xu, et al., "An Intelligent Estimation Method for Product Design Time", The International Journal of Advanced Manufacturing Technology, vol. 30, No. 7-8, Oct. 2006, pp. 601-613.

Zhang, et al., "Managing Modularity in Product Family Design with Funtional Modeling", The International Journal of Advanced Manufacturing Technology, vol. 30, No. 7-8, Oct. 2006, pp. 579-588.

* cited by examiner

| Factors | 0% | | 2% | | 8% | | 15% | | Learning Curve Rate (ci) | Learning Progress Rate (bi) |
|---|---|---|---|---|---|---|---|---|---|---|
| | F Value | P | F Value | P | F Value | P | F Value | P | | |
| Fix | 1037.991 | 0.000 | 736.358 | 0.000 | 489.049 | 0.000 | 244.485 | 0.000 | | |
| $y_{1xETO}$ | 1.823 | 0.180 | 3.888 | 0.052 | 1.933 | 0.168 | 0.438 | 0.510 | 80.00% | 32.19% |
| $y_{2xETO}$ | 208.026 | 0.000 | 15.387 | 0.000 | 35.605 | 0.000 | 48.941 | 0.000 | 83.70% | 26.00% |
| $y_{3xETO}$ | 1.380 | 0.243 | 2.558 | 0.113 | 73.104 | 0.000 | 56.751 | 0.000 | 89.00% | 17.00% |
| Finish Rate | 1.181 | 0.280 | 44.628 | 0.000 | 48.148 | 0.000 | 6.955 | 0.010 | | |
| $s_{1x}$ | 58.059 | 0.000 | 18.405 | 0.000 | 2.375 | 0.127 | 4.601 | 0.035 | | |
| $s_{2x}$ | 12.853 | 0.001 | 20.979 | 0.000 | 4.673 | 0.033 | 2.994 | 0.087 | | |
| $s_{3x}$ | 75.871 | 0.000 | 94.569 | 0.000 | 55.163 | 0.000 | 19.261 | 0.000 | | |
| $R^2$ | 0.939 | | 0.912 | | 0.886 | | 0.809 | | | |

ASYNCHRONOUS STOCHASTIC LEARNING CURVE EFFECTS IN A LARGE SCALE PRODUCTION SYSTEM

CROSS REFERENCE TO RELATED APPLICATIONS

This patent application claims priority under 35 U.S.C. §120 from U.S. Provisional Application No. 60/939,311 filed May 21, 2007, which provisional application is incorporated herein by reference.

FIELD OF THE INVENTION

The field of the present disclosure relates to arithmetic modeling of production systems and processes, and more specifically, arithmetic modeling of large scale engineer-to-order production systems using asynchronous stochastic learning curves.

BACKGROUND

Mass customization is a paradigm which is being recognized as a means to achieve a competitive advantage. Among the first industries to adopt the new paradigm of mass customization were producers of consumer goods, which needed to differentiate their products from those of their competitors by tailoring their products to the customers' demands.

Following the success of earlier mass producers adopting the mass customization paradigm, a number of different industries also embraced mass customization as a business strategy. Among these industries were several companies within the engineer-to-order sector which recognized that the tools and methods from mass customization could be utilized to improve fit with customer demands.

In some cases, however, large scale engineer-to-order production systems of complicated products (e.g. commercial airplanes) present unique concerns. For example, such production systems typically involve the integration of a variety of different processes by a variety of different parties (e.g. system integrator, partners, suppliers, product designers, custom feature configures, etc.) having different lead times and learning curves. Such large scale customization production systems may therefore contain dynamic, unequally distributed lead times and improvement rates, making it very difficult to statistically predict the ability of component providers within such a system to meet common deadlines simultaneously. The problem may be further compounded when the component providers are distributed around the entire world. Techniques that enable improvements in such mass customization production systems would have considerable utility.

SUMMARY

The present disclosure is directed to arithmetic modeling of mass customization production systems using asynchronous stochastic learning curves. Techniques in accordance with the present disclosure may advantageously enable statistical analysis of the ability of multiple component providers to meet common deadlines simultaneously, and may provide improved capabilities to conduct studies directed to the understanding and improvement of such mass customization production systems.

In one embodiment, a method for simulating a production system configured to produce a product includes, for a plurality of components, assigning learning curve parameters for an asynchronous stochastic learning curve associated with each component. Master schedule data for manufacturing a plurality of the product are received, and production of the plurality of components a plurality of cycles corresponding to the plurality of the product is simulated. The results of the simulated productions are output for analysis. In a further aspect, the product is an aircraft, and the components are aircraft components.

In another embodiment, a system for simulating a production system configured to produce a product includes a first component configured to assign learning curve parameters for an asynchronous stochastic learning curve associated with each of a plurality of components; a second component configured to receive master schedule data for manufacturing a plurality of the product; a third component configured to simulate production of the plurality of components a plurality of cycles corresponding to the plurality of the product; and a fourth component configured to output results of the simulated productions for analysis.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

Embodiments of systems and methods in accordance with the teachings of the present disclosure are described in detail below with reference to the following drawings.

DETAILED DESCRIPTION

Figure 1:
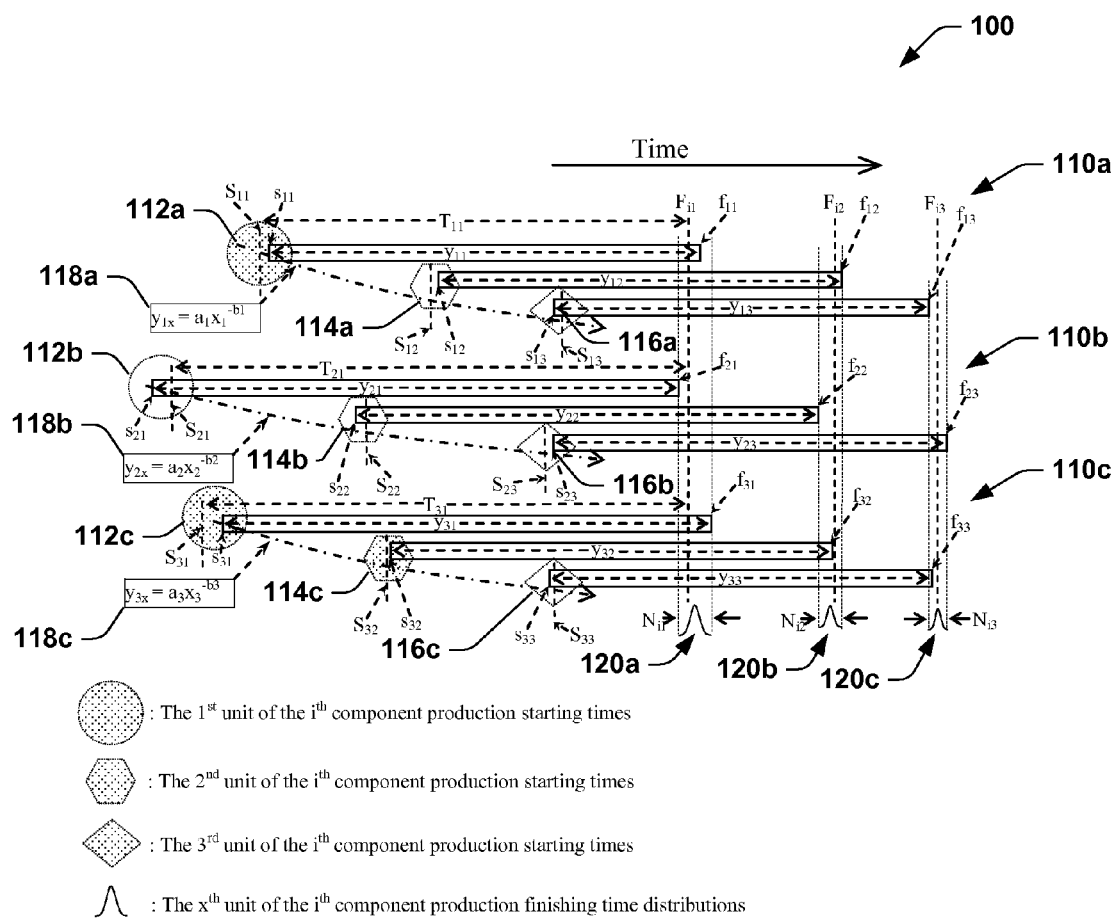
FIG. 1 is a schematic view of a production model represented using asynchronous stochastic learning curves (ASLC) in accordance with an embodiment of the present disclosure.

The present disclosure teaches systems and methods for arithmetic modeling of mass customization production systems and processes using asynchronous stochastic learning curves. Many specific details of certain embodiments of the invention are set forth in the following description and in FIGS. 1-7 to provide a thorough understanding of such embodiments. One skilled in the art, however, will understand that the invention may have additional embodiments, or that the invention may be practiced without several of the details described in the following description.

Generally, there are many mass customization production systems that require integration of components from a variety of partners, wherein each partner's process has a corresponding learning curve producing its respective component, and with different lead times corresponding to the delivery of the component. The process durations in such cases typically may not be deterministically defined or controlled, and the lead times of each respective component delivery process are not necessarily synchronized. Thus, there exists an asynchronous nature of the various process schedules of the partners involved in the production system. A conventional learning curve assumes a given process improves at a deterministic improvement rate. Real world processes, however, may have random events in them that make their learning curves stochastic rather than deterministic. Therefore, the present disclosure teaches techniques for arithmetic modeling of large scale engineer-to-order production systems that include asynchronous stochastic learning curves (ASLC).

Determining statistically predictable performance based on the roles and influence of all participants across different domains of production systems has been more art than science. The nature of ASLC with dynamic unequally distributed lead times and improvement rates have been very problematic for all partners to meet common deadlines simultaneously. The fact that people improve efficiencies when doing the same task repeatedly was addressed as the learning curve effect. The larger the integrated production system, the more complicated it becomes to customize product design and deployment. Challenges in unstable individual production starting times have significant impacts on the productivity of the overall system. Other challenges in modeling this system are associated with the speed of process improvements, unequal lead times, and production rate fluctuations.

For a single production line shop, all processes associated with the production line can be presented by one learning curve. When there are multiple processes occurring with different starting times and not necessarily the same ending time along with different learning curve rates, then there are asynchronous stochastic learning curves (ASLC) in the system. Low volume and highly customized products of a large scale production system have not been previously analyzed through the ASLC approach combined with dynamic interactive discrete event simulation modeling.

One common feature of prior art studies was that their processes were assumed to be independent processes without dynamic interactions with other processes characterized by different learning curves. On the other hand, embodiments of methods and systems in accordance with the present disclosure may use individual learning curves for each process that are asynchronous to other processes, and include dynamic interactions among processes. The use of asynchronous stochastic learning curves (ASLC) with dynamic, unequally-distributed lead times and improvement rates in accordance with the teachings of the present disclosure more accurately simulates system behavior among partners in large-scale production systems (LSPS), and provides improved LSPS integration, discrete event simulation modeling methods in LSPS integration, and statistical presentation of learning curves in LSPS.

Arithmetic Model of ASLC

Embodiments of methods and systems in accordance with the teachings of the present disclosure assume that at least some of the learning curves of the partners in a large-scale customized production system are stochastically asynchronous with different statistical distributions and potentially various flatten patterns. Process lead times may also be dynamically different due to the nature of ASLCs. Thus, the final product finishing dates fluctuate. The function of this invention is to evaluate how the final product finishing dates fluctuate in an ASLC-affected large-scale production system.

Some of the variables used in the arithmetical models of the present disclosure are as follows:

$y_{i,x}$: Time needed to process the $x_i^{th}$ unit of the $i^{th}$ component in the system $x_i$: The produced unit sequence number of the $i^{th}$ component in the system $a_i$: Time needed to produce the $1^{st}$ unit of the $i^{th}$ component in the system $b_i$: Learning progress rate of the $i^{th}$ component in the system $c_i$: Learning curve rate of the $i^{th}$ component in the system $F_{i,x}$: The targeted $x^{th}$ unit of the $i^{th}$ component arrival time at the final assembly $f_{i,x}$: The actual $x^{th}$ unit of the $i^{th}$ component arrival time at the final assembly $S_{i,x}$: The targeted $x^{th}$ unit of the $i^{th}$ component production starting time $s_{i,x}$: The actual $x^{th}$ unit of the $i^{th}$ component production starting time $T_{i,x}$: The targeted total flow time of the $x^{th}$ unit of the $i^{th}$ component $t_{i,x}$: The actual total flow time of the $x^{th}$ unit of the $i^{th}$ component $m_i$: The sequence number, which the learning curve flattens, of the $i^{th}$ component $N_{i,x}$: The on-time performance of the $x^{th}$ unit of the $i^{th}$ component Wright first introduced a learning curve in 1936 and his log 2 based model is still the best model in predicting future process performances. Wright's learning curve model is:

$$\log y = a + b \log x \quad (1)$$

In accordance with the teachings of the present disclosure, however, the ASLC further addresses many other system activities by having an additional asynchronized stochastic in nature index, i.

$$y_{i,x} = a_i x_i^{-b_i} \quad (2)$$

$$b_i = \frac{\log(c_i)}{\log 2} \quad (3)$$

$$\log(a_i) = \log(y_{i,m_i}) - b_i \log(m_i) \quad (4)$$

$$a_i = 10^{[\log(y_{i,m_i}) - b_i \log(m_i)]} \quad (5)$$

A time needed to process the $x_i^{th}$ unit of the $i^{th}$ component in the system without considering the flattening of the learning curve is given by:

$$y_{i,x_i} = 10^{[\log(a_i) + b_i \log(x_i)]} \quad (6)$$

A time needed to process the $x_i^{th}$ unit of the $i^{th}$ component in the system considering the flattening of the learning curve is given by:

$$y_{i,x_i} = \text{Maximum}\left[10^{[\log(a_i) + b_i \log(x_i)]}, 10^{[\log(a_i) + b_i \log(m_i)]}\right] \quad (7)$$

$$S_{i,x_i} = F_{i,x_i} - y_{i,x_i} \quad (8)$$

$$T_{i,x} = F_{i,x} - S_{i,x} \quad (9)$$

$$t_{i,x} = f_{i,x} - s_{i,x} \quad (10)$$

It is highly desirable to have all the $F_{i,x}$ and $f_{i,x}$ as close to the same as possible. It is very difficult to have all $S_{i,x}$ and $s_{i,x}$ synchronized at same times.

The on-time arrival performance can be described as:

$$N_{i,x} = f_{i,x} - F_{i,x} \quad (11)$$

The objective in the described system of ASLCs is to have all components arrival at their destinations simultaneously on time. The null hypothesis states that there is no fluctuation of component arrival times and the response of the null hypothesis can be stated as:

$$Ho: Y = N_{i,x_i} \approx 0_{\forall i} \forall x_i \quad (12)$$

$$Ha: Y = N_{i,x_i} \neq 0_{\forall i} \forall x_i \quad (13)$$

FIG. 1 is a schematic view of a production model 100 represented using asynchronous stochastic learning curves (ASLC) in accordance with an embodiment of the present disclosure. More specifically, Equations 3 through 12 are presented in the FIG. 1 to represent three groups of processes 110 with ASLC effects. The nature of the asynchronous process starting times is shown in three groups with shaded circular 112, hexagon 114, and diamond shapes 116. Three different learning curves 118 are shown as equations $y_{1x}$, $y_{2x}$, and $y_{3x}$. The stochastic nature of the system performance can be seen in FIG. 1, as the distributions 120 of the on-time arrivals $N_{i1}$, $N_{i2}$, and $N_{i3}$ are stochastically different.

Hypothesis Testing Method

Testing of the ASLC production model 100 of FIG. 1 using various hypotheses may be conducted by statistical verification using linear regression. An embodiment of linear regression analyses of the ASLC production model 100 will be described, leading to the results shown in FIG. 2. In these analyses, the response is the Y. All other variables, including customized events, will be treated as factors, or Xs. Customized events are events that are unique to certain processes in the system. The level of the customization may be different.

In the null hypothesis, all $y_{i,x}$ processes between $s_{i,x}$ and $f_{i,x}$, use deterministically fixed durations. In the alternative hypothesis, all processes between $s_{i,x}$ and $f_{i,x}$, have distributions with the min and max randomized deviate per a customization-affected-percentage from the mean.

All S can be derived by using a set of desired F and their respective T, while all s can be derived by using a random number generator per normal distributions around their S values. Statistical tests are performed using all of the s values plus the respective y values to derive their f values. Since the process times are riding on ASLCs, thus their final f values are not going to be the same at all times. Thus, the null hypothesis may be rejected when the N values for all components of all serial numbers are not always zero.

The nature of the ASLC encompasses various factors in the systems such as work-in-process, speed of process improvements, factors associated with human learning and performance, and facility limitations. All of these factors are presented in the series of $y_{i,x}$ values. As shown in FIG. 1, the ASLC production model 100 includes three groups of processes 110 with ASLC effects, each process 110 producing a component of a customized product. The processes 110 are assumed to include different learning curve rates ($c_i$) and learning progress rates ($b_i$). Linear regression analyses have been performed with the three groups of processes 110 assuming 100 units are produced (i=1, 2, 3; x=1, 2, 3, ... 100), e.g.:

$y_{1,1}, y_{1,2}, y_{1,3}, \ldots, y_{1,100},$
$y_{2,1}, y_{2,2}, y_{2,3}, \ldots, y_{2,100},$
$y_{3,1}, y_{3,2}, y_{3,3}, \ldots, y_{3,100}.$ In this embodiment, the linear regression is combined with the Analysis of Variance (ANOVA) method, as seen in the Equation (14) below:

$$1m(\text{formula} = N \sim F_{ix} + y_{1x} + y_{2x} + y_{3x} + \text{Finish.Rate} + s_{1x} + s_{2x} + s_{3x}) \quad (14)$$

where the Finish.Rate is the interval between two adjacent Fix entities

The smaller the Finish.Rate in Equation (14), the faster the final production delivery frequencies. Coefficients of all factors are in the scalar format, since the relationships among all of them to the N are held constant across all components and all units for each component. The response, N, in Equation (14) is the process finish time span from the earliest to the latest component of the same unit number, or serial number, as shown in the Equation (15) below:

$$N_x = \text{MAX}(f_{1x}, f_{2x}, f_{3x}, F_x) - \text{MIN}(f_{1x}, f_{2x}, f_{3x}, F_x) \quad (15)$$

A case study of engineering changes is applied to illustrate the ASLC production model 100. For example, in a simplified scenario, an airplane may be configured and customized in a product configuration system which automates portions of the sale-to-delivery process. The product range implemented in this system comprises so-called standard products for which a number of engineering processes are automated. Customers often request features for the products which are not included in the standard product portfolio ranging from minor adjustments to major structural changes of the main components of the airplane.

For example, in one embodiment, engineering changes due to customer requests are categorized into three distinct categories: minimum, medium, and large changes. Depending on the specific case, a minimum engineering change in a configuration may be assumed to increase the total duration for the process up to approximately 2%. A medium change is a type of configuration change that varies depending on how much the new configuration deviates from the standard product portfolio, but it may increase the process time duration up to 8%. A large change is a kind of configuration change that can increase the total duration of a process as much as 15%. Of course, in alternate embodiments, other definitions for minimum, medium, and large changes may be assumed.

In this embodiment, the randomization of factors is performed as follows:

$$y_{ixETO} = y_{ix} \times (1 + \text{random}(\#) \times \text{Customization \% changes}) \quad (16)$$

$$s_{ix} = S_{ix} + (0.5 - \text{random}(\#)) \times (10\% \text{ of the Finish Rate} \times \text{random}(\#) \times \text{Finish Rate}) \quad (17)$$

The customization related process duration, $y_{ixETO}$ in Equation (16), is to add the customization effect to the original process duration by using a random number (random(#)) between 0 and 1 to multiply the percent of the change. The actual starting times ($s_{ix}$) also vary depending on the Finish Rate. The assumed 10% multiplier may be adjusted as desired to provide alternate embodiments.

The on-time performance of the $x^{th}$ unit of the $i^{th}$ component, N, is the response in the analysis, as indicated in the Equation (15). In the embodiment of the linear regression studies shown in FIG. 2, multiple linear regressions were performed per different percentages of the customizations, while the same set of learning curve rate ($c_i$) and learning progress rate ($b_i$) were applied to all $y_{ixETO}$'s.

Many factors may have singularity issues throughout the linear regression analyses. The factors shown in FIG. 2 do not have singularity issues. A Fix factor (the targeted $x^{th}$ unit of the $i^{th}$ component arrival time at the final assembly) is shown in FIG. 2 for illustration, even with low P values (a percent of observed evidence that is against the Null Hypothesis, wherein the smaller the P value the more statistical evidence is shown to against the Null Hypothesis; a commonly used threshold to reject a Null Hypothesis is to have a P value<0.05 or 5%), but its drastically reducing F Value (F Value indicates a measure of distance between the distribution of the Null Hypothesis and the normal, or Z, distributions; the higher the F Value, the lower the P Value) indicates the relevant importance of the Fix factor reduces as the level of customization increases.

Figures 2, 3:
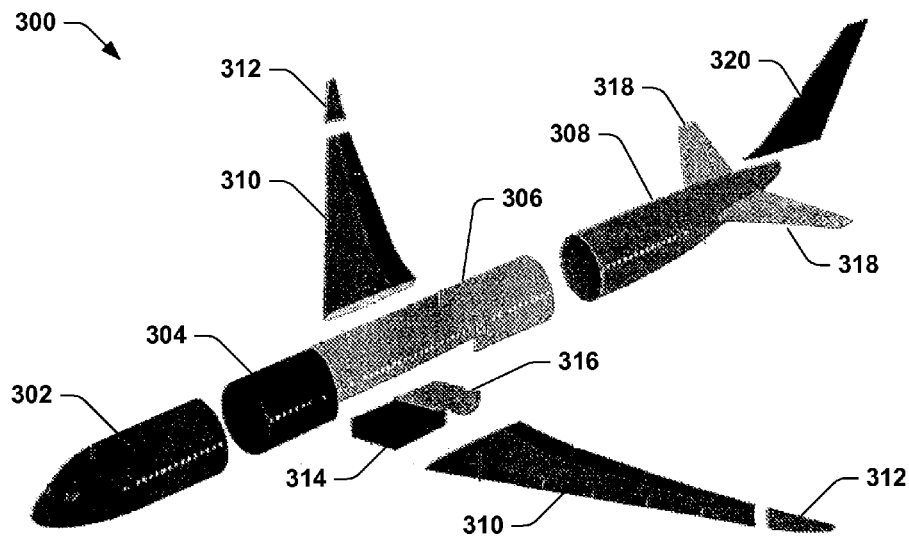
FIG. 2 is a table showing linear regression results for the ASLC model of FIG. 1.
FIG. 3 is an exploded isometric view of an aircraft manufactured in accordance with an embodiment of the present disclosure.

As shown in FIG. 2, the $y_{1xETO}$ has the best learning progress rate ($b_i$) and the best learning curve rate ($c_i$) among the three processes 110, and shown as not a significant (P>0.05) factor in all cases. The $y_{3xETO}$ has the worst learning progress rate among the three, and shown as a significant factor when the customization levels are at both levels 8% and 15%. The increase of the customization percentages somewhat decrease the significance of the $s_{ix}$'s, mostly in $s_{2x}$, which P value increased to 8.7%, greater than 5%, at the 15% customization level. It is noticeable the $R^2$ value ($R^2$ value, from 0 to 1, means how predictable is the statistical analysis; the higher the value the better the correlation) consistently decreases as the customization percentage increases. Intuitively, this also makes sense.

The Finish Rate factor is selected to show that in addition to stochastic process times ($y_{ixETO}$) and starting times ($s_{ix}$), the Finish Rate significance levels changes among different customizations. The sensitivity of the Finish Rate increases relatively fast (from 0.280 to 0.000) as soon as there is a 2% customization in the system. At the 2% customization, however, the $y_{1xETO}$ value (0.052) is not between the 0% customization and the 8% customization. It is believed that this result may be caused by the nature of the randomization scheme in the system.

The case study results shown in FIG. 2 indicate that the ASLC model 100 works in a simplified example system via a linear regression and ANOVA exercise. It will be appreciated that in alternate embodiments of an integrated large scale production system, the results shown in FIG. 2 may only present a segment of the total system.

Exemplary Large-Scale Production System Using ASLC Model

FIG. 3 is an exploded isometric view of an aircraft 300 manufactured using an ASLC production model in accordance with another embodiment of the present disclosure. In this embodiment, the aircraft 300 includes a plurality of components that may be manufactured by a plurality of manufacturing partners. More specifically, a nose component 302 is coupled to a forward fuselage component 304, which in turn is coupled to a center fuselage component 306. Also coupled to the center fuselage component 306 is an aft fuselage component 308, a pair of wings 310 via a wing box 314, and a main landing gear wheel well 316. A winglet 312 is coupled to a tip portion of each wing 310, and horizontal stabilizers 318 and a tail fin 320 are coupled to the aft fuselage component 308.

Figure 4:
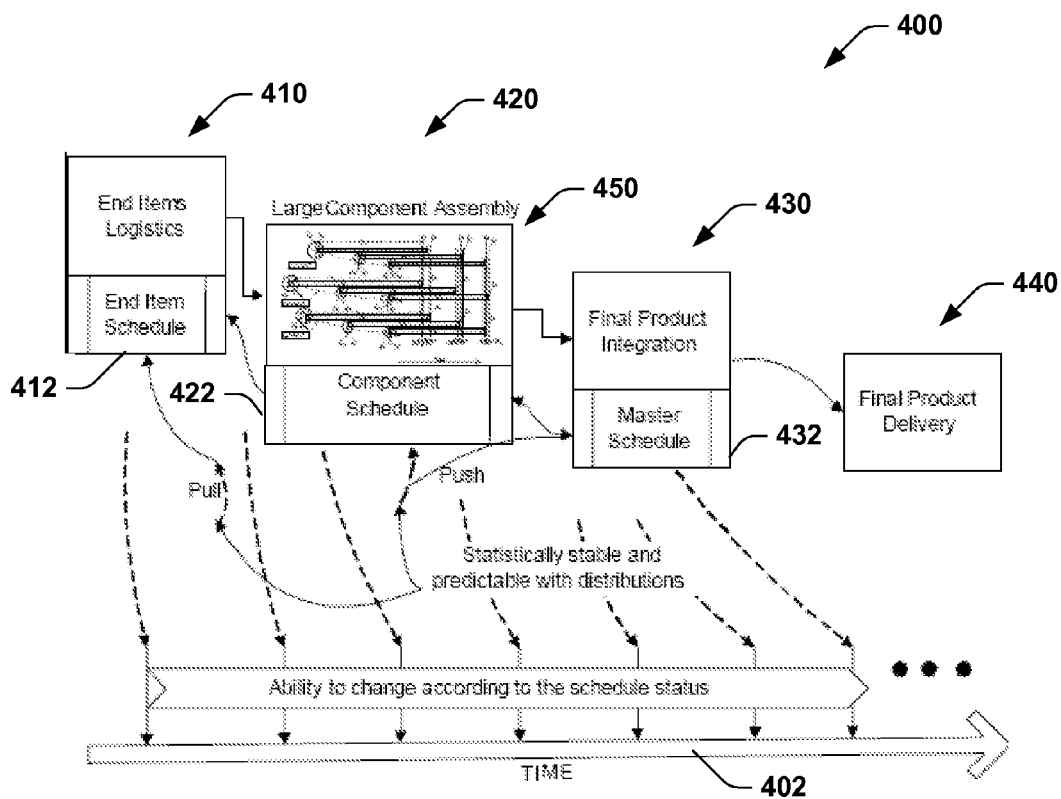
FIG. 4 is a schematic view of a large scale production system including ASLC in accordance with another embodiment of the present disclosure.

FIG. 4 is a schematic view of a large scale production system 400 including ASLC that may be used to model and analyze the process of manufacturing the aircraft 300 of FIG. 3. In this embodiment, the system 400 includes an end item logistics portion 410 having an end item logistics schedule 412. A large component assembly 420 is positioned adjacent the end item logistics portion 410 along a time scale 402, and includes a large component assembly schedule 422 and an asynchronous stochastic learning curves (ASLC) model 450 in accordance with an embodiment of the present disclosure. In some embodiments, the ASLC model 450 may include the ASLC model 100 described above with respect to FIG. 1. Also, in further embodiments, both the end item logistics schedule 412 and the large component assembly schedule 422 are statistically stable and predictable with typical distributions.

Continuing along the time scale 402, a final product integration 430 includes a master schedule 432. Changes in the master schedule 432 may be "pushed" to the large component assembly schedule 422, and in some embodiments, to the end item logistics schedule 412. The final product integration 430 leads to a final product delivery 440. The ability to change levels of product customization according to the schedule status along the product integration time scale varies because of constraints imposed by statistically stable and predictable end item/component/final product customizable feature distributions. The push and pull events among major process steps, 412, 422, and 432, combined with the level of customizations, influences the system response before all ASLC featured components reach the final integration process location, 440.

Figure 5:
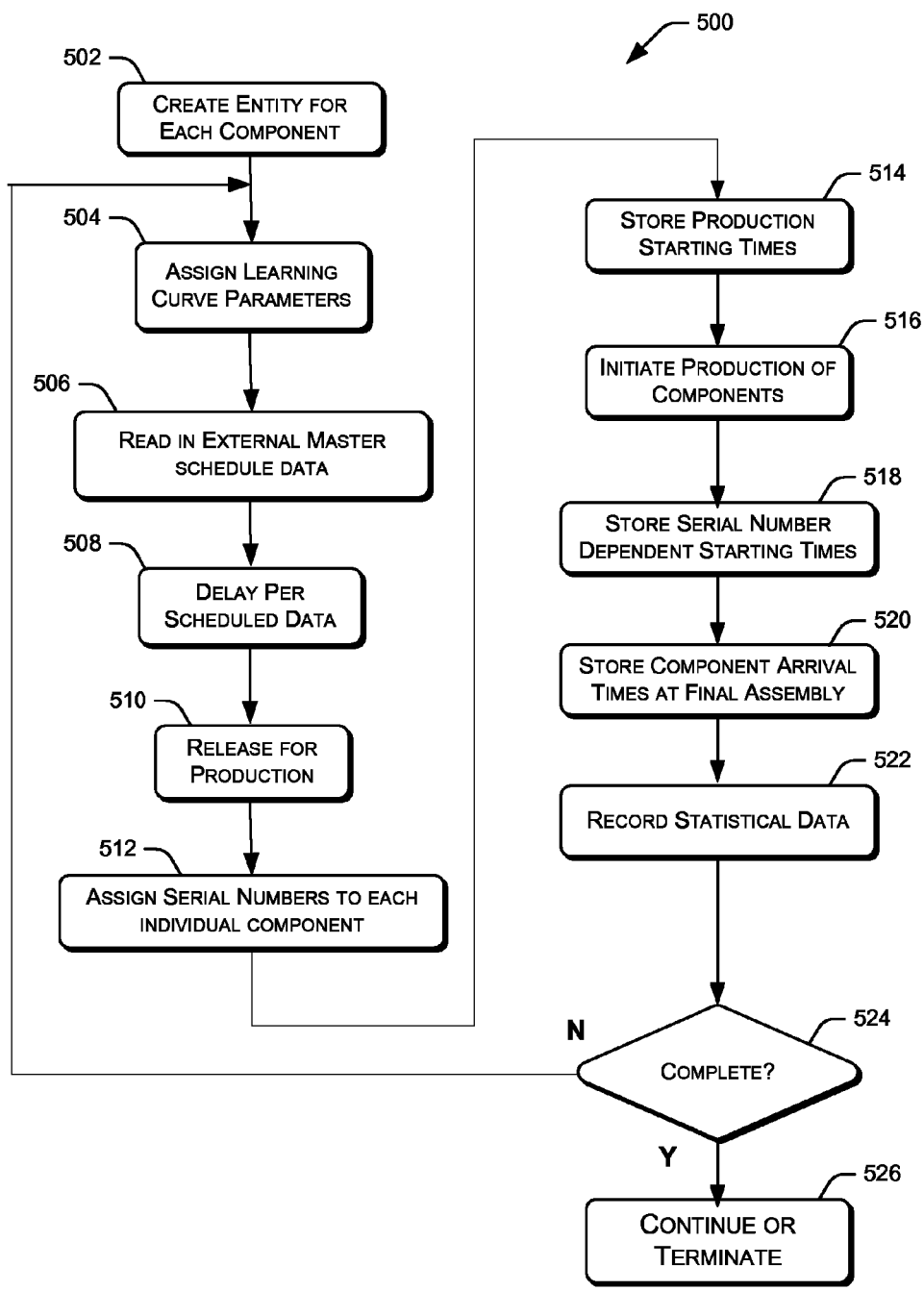
FIG. 5 is a flow chart of a method of modeling a large scale production system in accordance with another embodiment of the present disclosure.

FIG. 5 is a flow chart of a method 500 of modeling a large scale production system in accordance with another embodiment of the present disclosure. In this embodiment, the method 500 includes creating an entity for each component at 502, and assigning learning curve parameters $a_i$, $b_i$, and $c_i$ at 504. At 506, the external master schedule data are input (or read in). For example, in a representative embodiment, the external master schedule data may include schedule dates for all of the components 302-320 necessary to produce a desired number (e.g. 100) of the aircraft 300. At 508, delays are presented as production starting times ($s_{ix}$'s), and at 510, one or more releases for production are established as the starting times ($y_{ix}$'s). Serial numbers (x's) for each of the components (i's) are assigned at 512 so that differences of their final finish times can be tracked. At 514, all of the production starting times ($s_{ix}$'s) are written or stored to an external file for later verification.

At 516, production of the components is performed. More specifically, all serial number dependent starting times ($y_{ix}$'s) are executed. All serial number dependent starting times ($y_{ix}$'s) are written or stored to an external file at 518 for later verification purposes. At 520, all of the component arrival times $f_{ix}$ at the final assembly are written or stored, and other statistical data of interest in the component manufacturing process are stored to a common format simulation output file at 522. The method 500 then determines whether all of the desired components have been processed through the model at 524. If not, the method 500 returns to 504 and repeats the above-described actions from 504 to 524 until all the desired components have been processed. When all the desired components have been processed, then the method 500 continues or terminates at 526.

Figure 6:
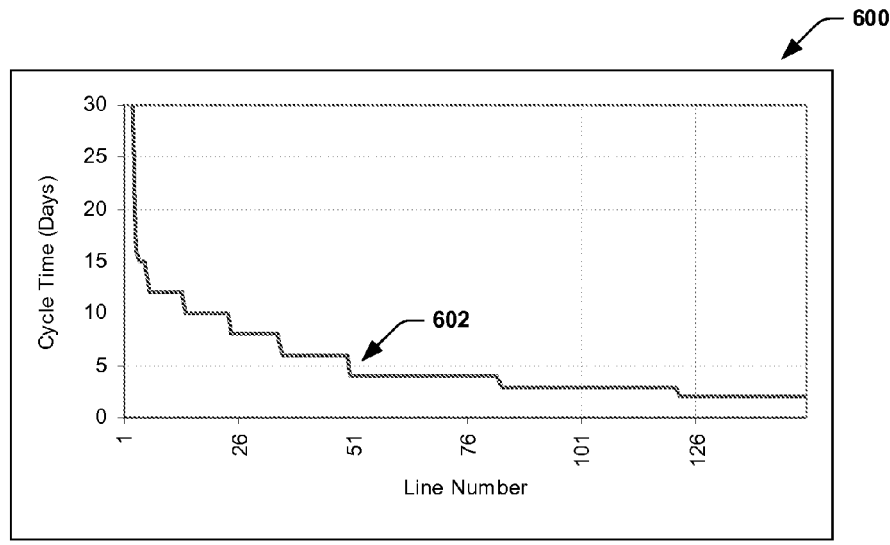
FIG. 6 is a graph showing a representative component production cycle time.

FIG. 6 is a graph 600 showing a representative component production learning curve 602. As described above, the learning curve 602 may be stochastic and asynchronous with respect to the learning curves of other components (not shown) of a large-scale production system, such as the aircraft manufacturing system 400 (FIG. 4) described above. In some embodiments, the learning curve 602 may be an assumed or predicted learning curve, and may be used to derive the initial learning curve parameters ($a_i$, $b_i$, and $c_i$) assigned during the LSPS modeling method 500 described above (see block 504 of FIG. 5). Alternately, the learning curve 602 may be formed using actual component manufacturing data (e.g. blocks 520 and 522 of the method 500 of FIG. 5), and may be used to provide empirical data to future LSPS modeling activities using ASLC's in accordance with the teachings of the present disclosure.

Figure 7:
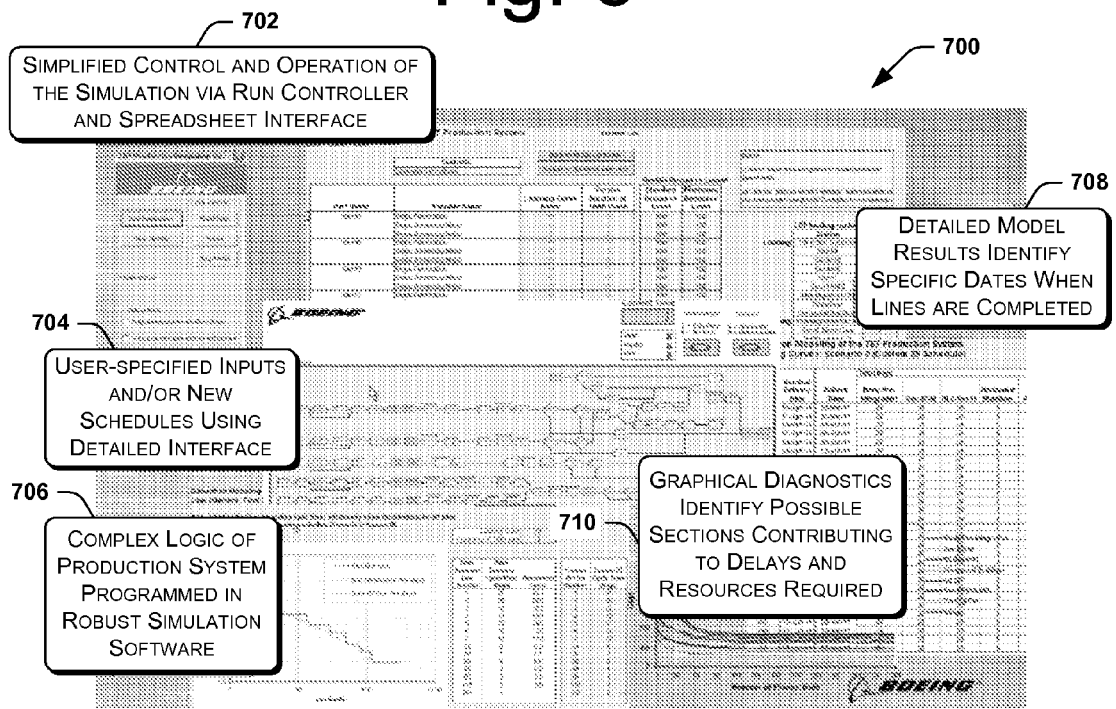
FIG. 7 is a schematic overview of a process for modeling a large-scale production system for manufacturing customized products in accordance with another embodiment of the present disclosure.

FIG. 7 is a schematic overview of a process 700 for modeling a large-scale production system (LSPS) for manufacturing customized products in accordance with another embodiment of the present disclosure. In this embodiment, a user may control and operate a simulation of the LSPS using a run controller and spreadsheet interface at 702. At 704, the user may provide user-specified inputs (e.g. learning curve rates, resource capacities, maximum capacity levels, input schedules, etc.), and may also generate new schedules for input into the simulation using the user interface. The simulation includes complex logic related to the operational aspects of the LSPS coded into robust simulation software, including embedded algorithms for identifying capacity requirements needed to achieve target rollout dates, at 706. Detailed simulation results identify specific dates when lines are completed at 708. And at 710, graphical diagnostics identify possible sections of the LSPS that may be contributing to delays, and may also identify resources required to meet the customized product target rollout dates.

Embodiments of methods and systems in accordance with the present disclosure may provide significant advantages over the prior art. For example, such embodiments may help analysts research and improve large-scale production systems configured to manufacture customized products with the ASLC effects. Such embodiments provide the ability to analyze learning curve effects while they are still stochastically asynchronized, and further enhance analytical capabilities of the LSPS to a variety of variables, including: mass customization influences, production rate change impacts to all parties in the supply chain, logistics in transporting large size items globally, customized product design and production considerations, customer ordering points for fixed and for customized configurations, impacts of unexpected events and change orders in LSPS, and production balance between existing learning curves and increasing planned/unplanned changes.

Computer software models including embodiments of the present disclosure may provide the ability to perform technical analyses to evaluate, for example, critical rates and related business issues, resource allocations, timings of minor model and block point introductions, total process times per component in the system versus resource and inventory needed to fulfill a different or maybe faster production rates while the whole production system is experiencing ASLC effects.

While specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

What is claimed is:

1. A method for simulating a production system configured to produce a product comprised of a plurality of different components sourced from different vendors, the method comprising:

creating an entity for each of the plurality of different components;

assigning to each entity learning curve parameters for individual asynchronous stochastic learning curves associated with each of the plurality of different components of the product, wherein assigning the leaning curve parameters comprise: assigning a time needed to process the $Xi^{th}$ unit of the $i^{th}$ component in the system taking into consideration flattening of the learning curve and is given by the following formula: $Y_{i,xi} = \text{Max}[10^{[\log(ai)+bi\ \log(xi)]}, 10^{[\log(ai)+bi\ \log(mi)]}]$ a time parameter, $a_j$, which represents a time needed to produce a first unit of an $i^{th}$ component;

a time learning progress rate, $b_j$, which represents a learning progress rate of the $i^{th}$ component; and a learning curve rate, $c_j$, for the $i^{th}$ component;

associating a delay with each of the plurality of different components;

receiving master schedule data for manufacturing a plurality of the product, wherein the master schedule data includes one or more schedule dates for each of the different components necessary to produce the product;

assigning a serial number to each of the plurality of different components; simulating production of the plurality of different components sourced from different vendors via a plurality of cycles corresponding to the plurality of the product;

storing a production start time and a component arrival time associated with each serial number in a memory; and outputting results of the simulated productions for analysis.

2. The method of claim 1, wherein assigning learning curve parameters includes assigning parameters for a learning curve given by $$y_{i,x} = a_i x_i^{-b_i} \text{ wherein } b_i = \frac{\log(c_i)}{\log 2}, \text{ and wherein}$$

$a_i$ represents a time needed to produce a first unit of an $i^{th}$ component, $b_i$ represents a learning progress rate of the $i^{th}$ component, and $c_i$ represents a learning curve rate of the $i^{th}$ component.

3. The method of claim 1, wherein simulating production of the plurality of different components sourced from different vendors includes:

simulating an end items logistics portion having an end item schedule; and simulating a large component assembly having a large component schedule.

4. The method of claim 3, wherein receiving master schedule data includes pushing master schedule data to at least one of the end item schedule and the large component schedule.

5. The method of claim 1, wherein simulating production of the plurality of different components sourced from different vendors includes simulating delays in the production of the plurality of different components as delayed starting times.

6. The method of claim 1, wherein simulating production of the plurality of different components sourced from different vendors includes simulating integration of the plurality of different components to form a corresponding one of the plurality of the product.

7. The method of claim 1, wherein outputting results includes outputting a process finish time span from an earliest component to a latest component having a same unit number.

8. A method for simulating an aircraft production system having a plurality of aircraft different components sourced from different vendors, the method comprising:

creating an entity for each of the plurality of different components;

assigning to each entity learning curve parameters for individual asynchronous stochastic learning curves associated with each of the plurality of aircraft different components sourced from different vendors, wherein assigning the leaning curve parameters comprise:
assigning a time needed to process the $Xi^{th}$ unit of the $i^{th}$ component in the system taking into consideration flattening of the learning curve and is given by the following formula: $Y_{i,xi} = \text{Max}[10^{[log(ai+bi\ log(xi))]}, 10^{[log(ai)+bi\ log(mi)]}]$ a time parameter, $a_j$, which represents a time needed to produce a first unit of $i^{th}$ an component;

a time learning progress rate, $b_j$, which represents a learning progress rate of the $i^{th}$ component; and a learning curve rate, $c_j$, for the $i^{th}$ component;

associating a delay with each of the plurality of different components;

receiving master schedule data for manufacturing a plurality of aircraft product, wherein the master schedule data includes one or more schedule dates for each of the different components necessary to produce the product;

assigning a serial number to each of the plurality of different components;

simulating production of the plurality of aircraft different components sourced from different vendors via a plurality of cycles corresponding to the plurality of aircraft;

storing a production start time and a component arrival time associated with each serial number in a memory; and outputting results of the simulated productions for analysis.

9. The method of claim 8, wherein simulating production of the plurality of aircraft different components sourced from different vendors includes:

simulating an end items logistics portion having an end item schedule; and simulating a large component assembly having a large component schedule; and wherein receiving master schedule data includes pushing master schedule data to at least one of the end item schedule and the large component schedule.

10. The method of claim 8, wherein simulating production of the plurality of aircraft different components includes simulating delays in the production of the plurality of aircraft different components as delayed starting times.

11. A system for simulating a production system configured to produce a product comprised of a plurality of different components sourced from different vendors, the system comprising:

a large component assembly including an asynchronous stochastic learning curve model and a processor configured to:

create an entity for each of the plurality of different components;

assign to each entity learning curve parameters for individual asynchronous stochastic learning curves associated with each of the plurality of different components sourced from different vendors, wherein assigning the leaning curve parameters comprise:
assigning a time needed to process the $Xi^{th}$ unit of the $i^{th}$ component in the system taking into consideration flattening of the learning curve and is given by the following formula: $Y_{i,xi} = \text{Max}[10^{[log(ai+bi\ log(xi))]}, 10^{[log(ai)+bi\ log(mi)]}]$ a time parameter, $a_j$, for production of a first unit of an $i^{th}$ component;

a time learning progress rate, $b_j$, for the $i^{th}$ component; and a learning curve rate, $c_j$, for the $i^{th}$ component, associate a delay with each of the plurality of different components;

receive master schedule data for manufacturing a plurality of aircraft product, wherein the master schedule data includes one or more schedule dates for each of the different components necessary to produce the product;

assign a serial number to each of the plurality of different components;

simulate production of the plurality of components via a plurality of cycles, storing a production start time and a component arrival time associated with each serial number in a memory; and output results of the simulated production for analysis; and a final product integration positioned adjacent to the large component assembly along a time scale, the final product integration including a master schedule that includes schedule dates for the plurality of different components.

12. The system of claim 11, wherein the system further comprises an end item logistics portion having an end item schedule.

13. The system of claim 12, wherein the large component assembly is positioned adjacent to the end item logistics portion along the time scale.

14. The system of claim 11, wherein the large component assembly is further configured to simulate delays in a production of the plurality of different components sourced from different vendors as delayed starting times.

15. The system of claim 11, wherein the final product integration is further configured to push a change to the master schedule to the large component assembly.

16. The system of claim 11, wherein the system further comprises a final product delivery positioned adjacent to the final product integration along the time scale.

* * * * *